United States Patent
Basset

(10) Patent No.: US 9,399,395 B2
(45) Date of Patent: Jul. 26, 2016

(54) TANK PROVIDED WITH AN OVER-PRESSURE VALVE

(71) Applicant: AIRBUS HELICOPTERS, Marignane, Cedex (FR)

(72) Inventor: Gregory Basset, Martigues (FR)

(73) Assignee: Airbus Helicopters, Marignane (FR)

( * ) Notice: Subject to any disclaimer, the term of this patent is extended or adjusted under 35 U.S.C. 154(b) by 135 days.

(21) Appl. No.: 14/220,357

(22) Filed: Mar. 20, 2014

(65) Prior Publication Data

US 2014/0283920 A1 Sep. 25, 2014

(30) Foreign Application Priority Data

Mar. 22, 2013 (FR) ..................... 13 00668

(51) Int. Cl.
*B60K 15/03* (2006.01)
*B64D 37/32* (2006.01)

(52) U.S. Cl.
CPC .......... *B60K 15/03006* (2013.01); *B64D 37/32* (2013.01); *B60K 15/03* (2013.01); *B60K 2015/03105* (2013.01); *B60K 2015/03473* (2013.01); *Y10T 137/0396* (2015.04)

(58) Field of Classification Search
CPC ............. B60K 15/03; B60K 15/03105; B60K 15/03473
USPC ............... 137/14, 899.2; 220/562; 244/135 R
See application file for complete search history.

(56) References Cited

U.S. PATENT DOCUMENTS

| 2,461,096 | A | * | 2/1949 | Wagner | B65D 37/06 156/188 |
|---|---|---|---|---|---|
| 4,376,446 | A | | 3/1983 | Liff | |
| 5,180,190 | A | * | 1/1993 | Kersey | B29C 63/0021 220/562 |
| 5,277,217 | A | | 1/1994 | Kobayashi et al. | |
| 5,398,839 | A | * | 3/1995 | Kleyn | B60K 15/03177 220/4.14 |
| 6,293,419 | B1 | * | 9/2001 | Farrar | F02M 37/103 220/23.89 |
| 6,612,458 | B2 | * | 9/2003 | Balzer | B60K 15/03177 220/4.13 |
| 6,997,203 | B2 | * | 2/2006 | Tsigonis | E02B 13/02 137/14 |
| 7,493,894 | B2 | * | 2/2009 | Davis | B60K 15/03177 123/519 |
| 2008/0078457 | A1 | | 4/2008 | Sandiford | |
| 2009/0236350 | A1 | | 9/2009 | Miura | |

FOREIGN PATENT DOCUMENTS

| FR | 2998268 A1 * | 5/2014 | ............ B64D 37/16 |
|---|---|---|---|
| WO | 2010131099 | 11/2010 | |
| WO | 2012123941 | 9/2012 | |

OTHER PUBLICATIONS

French Search Report for FR 1300668, Completed by the French Patent Office on Nov. 15, 2013, 6 Pages.

* cited by examiner

*Primary Examiner* — John K Fristoe, Jr.
*Assistant Examiner* — Christopher Ballman
(74) *Attorney, Agent, or Firm* — Brooks Kushman P.C.

(57) ABSTRACT

A tank (10) including a container (15) and a flow line (20) for discharging excess fuel. Said flow line (20) is provided with a pipe (21) and an over-pressure valve (24) arranged inside the container (15). In addition, the tank (10) includes a leaktight bell (30) arranged inside said container, said bell (30) being over the over-pressure valve (24) and surrounding the over-pressure valve (24) at least in part so as to hold air captive in order to isolate the over-pressure valve (24) from the fuel content when said pressure is below said threshold.

19 Claims, 1 Drawing Sheet

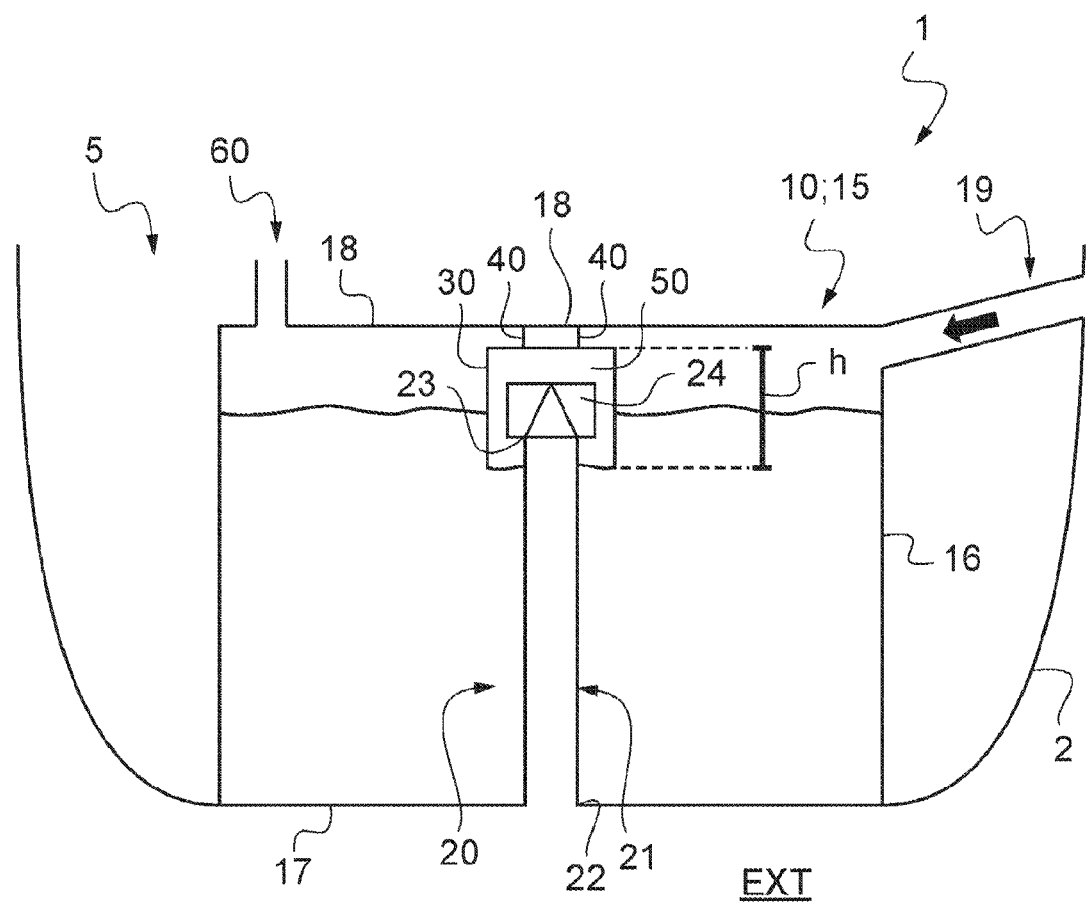

TANK PROVIDED WITH AN OVER-PRESSURE VALVE

CROSS REFERENCE TO RELATED APPLICATION

This application claims priority to French patent application No. FR 13 00668 filed on Mar. 22, 2013, the disclosure of which is incorporated in its entirety by reference herein.

BACKGROUND OF THE INVENTION (1) Field of the Invention

The present invention relates to a tank provided with an over-pressure valve, and also to an aircraft and to a method implementing the tank.

(2) Description of Related Art

An aircraft may include a pressurized filler circuit for filling at least one fuel tank on the ground and/or in flight. The pressurized filler system may possibly allow fuel to be extracted from the tank by suction.

Certification regulations require means for limiting the quantity of fuel in a tank in order to avoid damage in the event of said quantity exceeding a threshold. For example, the regulation known under the reference CS 29.979 makes provision for such an installation.

A filler system may thus be fitted with solenoid valves in order to stop filling as from there being a certain quantity of fuel present in at least one tank.

Furthermore, a fuel storage system of an aircraft includes at least one vent circuit for connecting the tank to the outside air. Such a vent circuit may possess two types of valve in order to allow air to pass from a tank to an outside medium, and vice versa, namely:

a first type of valve known as an "air-no-fuel valve" that closes when in contact with fuel; and a second type of valve known as a "roll-over valve" that closes as from a threshold angle of inclination independently of the presence or absence of contact with fuel.

A roll-over valve may include a ball suitable for moving as a function of the angle of inclination of the aircraft in order to shut off the vent circuit as from a threshold angle, e.g. as a result of the aircraft rolling over. A roll-over valve thus allows at least one tank to be vented so long as the aircraft is operating under normal flight conditions.

A vent circuit may then possibly allow fuel to be discharged in the event of a solenoid valve malfunctioning. Nevertheless, certain dimensioning constraints can lead to a venting circuit being installed that does not have dimensional characteristics that allow this degraded mode of operation to take place. The diameter of the pipe in a vent circuit may be too small relative to the filling rate to allow excess fuel to be discharged in real time.

Under such circumstances, an aircraft may include at least one over-pressure valve in order to avoid the tank being put under pressure in the event of a malfunction preventing a solenoid valve from being closed. Under such accidental circumstances, the over-pressure valve opens as from a pressure threshold in order to discharge excess fuel from a tank.

In terms of configuration, two types of over-pressure valve installation are commonly used on a machine.

In a first configuration, the aircraft has a discharge pipe connected to a top portion of a tank, the pipe being placed outside the tank. An over-pressure valve is then secured to the discharge pipe. The over-pressure valve is then arranged outside the fuel tank.

Consequently, the over-pressure valve is not continuously in contact with fuel. That first configuration thus presents the advantage of avoiding fuel seepage as a result of an over-pressure valve being practically continuously in contact with fuel.

However, the aircraft must then provide sufficient space to allow the discharge pipe and the over-pressure valve to be installed.

Furthermore, it can be difficult to arrange an over-pressure valve in that first configuration, since the fuel discharge line needs to be arranged so as to avoid coming close to sensitive zones of the aircraft (zones that might be subjected to high temperatures, zones where maintenance personnel might take action, . . . ).

In a second configuration, the aircraft has a discharge pipe extending inside the tank in order to open out in the outside air, e.g. under the fuselage. An over-pressure valve is then secured to the discharge pipe. The over-pressure valve is then arranged inside the fuel tank.

That second configuration would appear not to suffer from the drawbacks of the first configuration because of the arrangement of the discharge line inside the tank.

Nevertheless, the over-pressure valve is then in contact with the fuel and runs the risk of seeping.

A manufacturer must thus select one or the other of those configurations depending on the constraints with which the manufacturer is confronted.

Document WO 2010/131099 discloses a breather valve for a fuel system on board an aircraft, serving in particular to facilitate pressurizing the tank.

Document WO 2012/123941 describes a device including simultaneously a roll-over valve, an over-pressure valve, and a pressure retention valve.

Document US 2008/0078457 discloses an over-pressure valve for an aircraft fuel tank. That over-pressure valve has two levels of response to a pressure difference between the inside and the outside of a tank. The second level is in addition to the first level in the event of a failure, e.g. because of ice.

Documents US 2009/236350, U.S. Pat. No. 4,376,446, and U.S. Pat. No. 5,277,217 are remote from the invention.

For example, Document US 2009/236350 describes a tank ventilation system and not a flow line for discharging excess fuel.

That ventilation system has a canister in communication via a set of pipes with two valves housed inside a tank. One valve includes movable float means, and the other valves includes movable float means upstream from two valves that open under a predetermined pressure of a gas.

BRIEF SUMMARY OF THE INVENTION

The present invention thus seeks to propose a tank having a novel configuration for tending to avoid the drawbacks of the prior art configurations.

The invention provides a storage tank of a fuel storage system of an aircraft, the storage tank including a container and a flow line for discharging excess fuel. Said flow line is provided with a pipe and an over-pressure valve arranged inside the container, the pipe leading to an outside medium outside the container and to the over-pressure valve, the over-pressure valve opening as from a threshold value of the pressure that exists inside said container.

The tank includes a leaktight bell arranged inside the container, the bell being over the over-pressure valve and surrounding the over-pressure valve at least in part so as to hold air captive in order to isolate the over-pressure valve from the fuel content when said pressure is below said threshold.

The manufacturer thus arranges a rated over-pressure valve inside the container, which valve opens from a predetermined threshold. The manufacturer also places a bell around the over-pressure valve.

The invention thus proposes positioning an over-pressure valve inside a tank, with a leaktight bell being placed over the valve so as to provide a pocket of air to isolate the over-pressure valve at least in part from the fuel so as to ensure that potential seepage is at least limited.

While filling under pressure, air is expelled from the tank via a conventional vent line. Nevertheless, some of that air is held captive inside the bell. Under such circumstances, the over-pressure valve thus have its inlet in the bubble of air and not in the fuel, so as to avoid fuel seepage.

If filling continues beyond the prescribed level, the pressure inside the tank increases. When the pressure of the fuel and thus the pressure of the air contained inside the bell reaches the threshold set by the manufacturer at which the over-pressure valve is rated, then the over-pressure valve opens.

The air present under the bell and then the fuel stored in the tank then escape from the tank via the over-pressure valve and via the pipe of the flow line.

This configuration thus presents the advantage of arranging an over-pressure valve in a space that is free from fuel under normal operating conditions, i.e. except in the event of excess pressure inside the tank. The risks of fuel seeping are thus minimized.

Furthermore, since the over-pressure valve is arranged inside the tank, this new configuration tends to minimize the drawbacks of the first configuration of the prior art, for example.

The tank may also include one or more of the following characteristics.

The tank may thus include a fastener for fastening the bell to a wall of the container. The bell is thus fastened to the inside of the container.

For example, the container comprises bottom and top walls connected together by a side wall, the bell being suspended from the top wall.

In a variant, the bell is fastened to the pipe or to the over-pressure valve, e.g. by a plurality of radial arms.

Furthermore, the bell is optionally machined so as to have no cutting edges. In particular, the bell may be made using a synthetic material that is not sharp so as to avoid cutting the skin of the container.

In addition, the bell may surround a part of the pipe. The bell may be of a height that is determined by the manufacturer so as to guarantee that a bubble is present regardless of the attitude of the tank, i.e. regardless of the angle of inclination of the tank.

Furthermore, the tank may include a venting system that is distinct from the flow line.

The invention also provides an aircraft including at least one tank of the above-described type.

The invention also provides a method of discharging fuel from such an aircraft tank, the method comprising forming a bubble of air around the over-pressure valve with the help of a bell in order to isolate the over-pressure valve from the fuel content when said pressure is below said threshold.

For an aircraft capable of operating in a predetermined range of attitudes, it is possible to dimension the bell so as to keep the bubble of air around the over-pressure valve for any attitude of the tank that lies within said range.

Furthermore, when the pressure is greater than said threshold, air and then fuel are discharged through the over-pressure valve and the pipe, and the over-pressure valve closes as soon as the pressure becomes lower than said threshold. The bubble of air is restored as soon as the level of fuel inside said tank becomes lower than a predetermined height.

Consuming the fuel thus makes it possible to lower the level of fuel in the tank. As from a predetermined height, the over-pressure valve is no longer immersed in fuel. The air bubble is then restored in natural manner.

Under such circumstances, it should be observed that the over-pressure valve can indeed be immersed in fuel, but only for a limited length of time.

BRIEF DESCRIPTION OF THE SEVERAL VIEWS OF THE DRAWINGS

The invention and its advantages appear in greater detail from the context of the following description of an embodiment given by way of illustration and with reference to the sole accompanying FIGURE.

The sole FIGURE shows an aircraft 1 having a fuselage 2. The aircraft is also fitted with a storage system 5 in order to feed a power plant with fuel.

DETAILED DESCRIPTION OF THE INVENTION

The storage system 5 thus comprises at least one tank 10 for storing fuel.

The tank 10 is provided with a container 15. The container 15 possesses a flexible or rigid envelope that extends upwards from a bottom 17 towards a top wall 18, passing via a side wall 16.

The tank 10 also includes filler means 19 leading to a top portion of the container 15.

The tank 10 may also be provided with a vent system 60 such as a vent circuit or an orifice leading to another tank that is vented.

The tank 10 also possesses an emergency system for avoiding damage in the event of the pressures inside the container being excessive.

Thus, the tank 10 is provided with a flow line 20 for discharging excess fuel to an outside medium EXT situated outside the tank and the aircraft.

The flow line includes a pipe 21 extending from a first end 22 towards a second end 23. The pipe is arranged inside the container 15. Under such circumstances, the first end 22 leads to the outside medium EXT by being fastened to the bottom 17 of the container, for example.

The flow line also includes an over-pressure valve 24 co-operating with the pipe. The over-pressure valve 24 is also arranged in the inside INT of the container, e.g. by being fastened to the second end 23 of the pipe. More precisely, the over-pressure valve 24 may include an inlet open to the inside INT of the container and an outlet leading to the second end 23 of the pipe 21.

The over-pressure valve is a conventional valve that opens above a pressure threshold. Consequently, as soon as the pressure inside the container reaches the threshold, the over-pressure valve opens and connects the inside INT of the container to the outside medium EXT.

The tank also includes a bell 30 that is leaktight. The bell 30 is arranged in the container 15 over the pipe 21, surrounding the over-pressure valve at least in part. Consequently, during filling, and so long as the pressure inside the container is less than said threshold, the tank has a bubble of air 50 defined by the bell 30 that surrounds the over-pressure valve 24 at least in part in order to isolate it from the fuel, i.e. a bubble of air that is in contact with at least the inlet of the over-pressure valve.

In the applied method, a bubble of air 50 is thus organized around the over-pressure valve 24 with the help of a bell 30 so as to isolate the over-pressure valve 24 from the fuel content, so long as the pressure that exists inside the container is below a threshold.

The bell 30 constitutes an upside-down container having its open face facing towards the bottom of the container 15. The bell 30 thus has a section that is substantially in the form of an upside-down U-shape.

The bell 30 may be fastened to a wall of the container 15 by at least one fastener 40, and in particular to the top wall 18 situated over the bell 30.

As an alternative or in addition, the bell may be fastened to the pipe 21 and/or to the over-pressure valve 24 by radial arms that allow fluid to pass into the bell 30.

In order to optimize the dimensions of the bubble of air and in order to ensure that it remains present around the over-pressure valve regardless of the angle of inclination of the tank, the bell may also surround the pipe 21. It is thus possible to dimension the bell 30, and in particular its height h, so as to maintain the bubble of air 50 around the over-pressure valve 24 independently of the attitude of the tank 10.

Consequently, while filling, the level of fuel in the container rises and approaches the top wall. The air present in the container is progressively expelled via the vent system. Nevertheless, some of this air remains captive under the bell 30 so as to isolate the over-pressure valve from the fuel.

In the event of a filling malfunction, the level of fuel may reach the top wall 18. The excess fuel then causes the pressure that exists inside the container to rise. When this pressure reaches the rated threshold of the over-pressure valve, the over-pressure valve opens. The excess fuel is then discharged to the outside medium by gravity through the over-pressure valve 24 and the pipe 21.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A storage tank of a fuel storage system of an aircraft, the storage tank including a container and a flow line for discharging excess fuel, the flow line being provided with a pipe and an over-pressure valve arranged inside the container, the pipe leading to an outside medium (EXT) outside the container and to the over-pressure valve, the over-pressure valve opening as from a threshold value of the pressure that exists inside the container, wherein the tank includes a leaktight bell arranged inside the container, the bell being over the over-pressure valve and surrounding the over-pressure valve at least in part so as to hold air captive in order to isolate the over-pressure valve from the fuel content when the pressure is below the threshold, wherein the bell includes an upside-down u-shape that surrounds the over-pressure valve such that an open face of the bell faces a bottom of the container.

2. A storage tank according to claim 1, wherein the tank includes a fastener for fastening the bell to a wall of the container.

3. A storage tank according to claim 1, wherein the container comprises a bottom and a top wall connected together by a side wall, the bell being suspended from the top wall.

4. A storage tank according to claim 1, wherein the bell is fastened to the pipe.

5. A storage tank according to claim 1, wherein the bell is fastened to the over-pressure valve.

6. A storage tank according to claim 1, wherein the bell does not have a sharp edge.

7. A storage tank according to claim 1, wherein the bell surrounds part of the pipe.

8. A storage tank according to claim 1, wherein the tank includes a vent system distinct from the flow line.

9. An aircraft, wherein the aircraft includes at least one tank according to claim 1.

10. A method of discharging fuel from a tank of an aircraft according to claim 9, the method comprising forming a bubble of air around the over-pressure valve with the help of a bell in order to isolate the over-pressure valve from the fuel content when the pressure is below the threshold.

11. A method according to claim 10, wherein the aircraft is capable of operating over a predetermined range of attitudes, and the bell is dimensioned so as to maintain the bubble of air around the over-pressure valve for all attitudes of the tank contained in the range.

12. A method according to claim 10, wherein when the pressure is greater than the threshold, air and then fuel is discharged through the over-pressure valve and the pipe and the over-pressure valve closes as soon as the pressure becomes lower than the threshold, the bubble of air being restored as soon as the level of fuel inside the tank becomes lower than a predetermined height.

13. A storage tank according to claim 1, wherein the outside medium (EXT) is the outside air surrounding the aircraft; and wherein the flow line is configured to discharge excess fuel from the container to the outside air surrounding the aircraft.

14. A storage tank according to claim 1 wherein the bell is fastened to the over-pressure valve such that the bell is fixed relative to the over-pressure valve.

15. A storage tank of a fuel storage system of an aircraft, the storage tank comprising:

a container;

a flow line positioned within the container and configured to discharge excess fuel from the container to outside the aircraft, the flow line comprising a pipe and an over-pressure valve, the pipe having a first end leading to outside the aircraft and a second end, the over-pressure valve fastened to the second end and having an inlet open to an inside of the container and an outlet fluidly coupled to the pipe, the over-pressure valve configured to open above a threshold value of pressure within the container; and a leaktight bell arranged inside the container and positioned over and surrounding the over-pressure valve such that the over-pressure valve is received within an interior region of the bell, the bell configured to provide an air pocket to isolate the over-pressure valve from fuel when a fuel level is above a bottom of the bell and pressure within the container is below the threshold value.

16. A storage tank according to claim 15, wherein the container comprises a side wall connecting a bottom and a top; and wherein the interior region of the bell is defined by a U-shaped section and an open face of the bell, the open face facing towards the bottom of the container, the pipe extending through the open face such that the over-pressure valve is received within the interior region of the bell.

17. A storage tank according to claim 16 wherein the first end of the pipe is connected to the bottom of the container.

18. A storage tank according to claim 16 wherein the inlet to the over-pressure valve is positioned within the interior region of the bell.

19. A method of discharging fuel from a tank of an aircraft comprising:
  positioning a flow line within a fuel container, the flow line having a pipe, an over-pressure valve, and a leaktight bell, the pipe having a first end leading to outside air and a second end, the over-pressure valve fastened to the second end and having an inlet open to an inside of the container and an outlet fluidly coupled to the pipe, the leaktight bell positioned over and surrounding the over-pressure valve such that the over-pressure valve is received within an interior hollow region of the bell, the leaktight bell having an open face facing a bottom wall of the container;
  maintaining a closed position of the over-pressure valve and an air pocket within the bell and surrounding the over-pressure valve when air pressure in the container is below a threshold and a fuel level in the container is above an open face of the bell such an air pocket is formed within the bell to provide a barrier between fuel in the container and the over-pressure valve to prevent fuel seepage across the over-pressure valve; and
  opening the over-pressure valve when air pressure in the container is above the threshold and the fuel level is above the open face of the bell such that air in the air pocket and fuel stored in the container escapes from the container via the over-pressure valve and the pipe of the flow line such that fuel is discharged from the container to outside the aircraft.

\* \* \* \* \*